Patented Dec. 1, 1936

2,062,378

UNITED STATES PATENT OFFICE 2,062,378

SOLVENT FOR RESINS

William Seaman, Glens Falls, N. Y., assignor to Standard Oil Development Company No Drawing. Application November 16, 1931, Serial No. 575,465

13 Claims. (Cl. 134—26)

This invention relates to new and improved solvents for resins both natural and synthetic, and more specifically to the use of organic sulfur compounds which may be derived from the sulfur compounds of petroleum as resin solvents.

It has been found that compounds of the formula $RSnR'$ in which R and R' may be any organic radical either aryl, alkyl or mixed and the same or different, and $n$ may be any integer but is preferably 1 or 2 and not greater than 5, are very desirable solvents for both natural and synthetic resins.

There are a great number of different types of resins now available on the market, some of which are readily soluble in various organic solvents and some, especially those which are substantially infusible or possess relatively high melting points, are very difficultly soluble or substantially insoluble in all solvents. The latter class may be classified as resinoids and includes the resins known under various trade names as Bakelite C, Resinit, and the like, and is not included in the scope of my invention. Both the natural and the artificial or synthetic resins such as the phenolformaldehyde resin of the Novalac type and others to be hereinafter described are soluble in these organic sulfides and their solutions may be used advantageously in many ways.

Among other examples of resins soluble in the organic sulfides are those obtainable from petroleum tars or by condensation of petroleum hydrocarbons by various means. Resins may be prepared by distillation to a temperature of 660° F. at an absolute pressure of about 1 mm. of mercury of a cracking coil tar obtained by cracking petroleum oils.

The residue from the above distillation is then extracted with low boiling paraffinic hydrocarbons or light solvent naphtha and a separation of soluble resins from insoluble asphaltenes is thereby obtained. This resin is called resin A of petroleum origin. These resins are soluble in light naphtha solvents such as gasoline, butane, etc., linseed oil, benzol, China-wood oil, and esters such as amyl acetate, are insoluble in water, alcohols and acetone, and are compatible with nitro-cellulose. Resins of this type are readily soluble in the organic sulfides alone or in admixture with the above solvents including even alcohol and acetone, and may be used with the organic sulfides and nitro-cellulose to form plastic lacquer films or moulded articles.

The distillate withdrawn between the temperatures of 300 and 660° C. in the above described distillation process may be chlorinated with gaseous chlorine and then by redistillation under vacuum the chlorine may be split off and the residual unsaturated hydrocarbons are readily converted into resins. The chlorinated distillate may also be condensed, using aluminum chloride as a condensation agent, to form highly desirable resins. These resins are called resin B of petroleum origin. This condensation may also be conducted in the presence of aromatic hydrocarbons such as naphthalene or the sulfur dioxide extract from petroleum oils. Each of these resins is soluble in organic sulfides.

Another type of resin soluble in the organic sulfides is that which may be prepared by condensing mercaptans or other similar organic sulfur compounds derivable from the sulfur compounds of petroleum with phenolic compounds and sulfur chlorides or other polymerizing agents.

The phenolic resins which may be prepared by condensing phenol or other aromatic hydroxy compounds with sulfur chloride or free sulfur or with aldehydes, olefines and the like, represent still another class of resins soluble in the organic sulfides. For example, both the thio-ethers and the disulfides possess excellent solubility for xylenol-sulfur monochloride resins. It is understood that in the preparation of each of the above types of resins the conditions favoring resin formation, such as temperature, are limited to prevent the condensation from going to such an extent that substantially insoluble and infusible resinoids are produced since the latter do not come within the scope of my invention.

As examples of the solvent capacity of the sulfides, the following examples illustrate the solubility of several resins in ethyl thio-ether at room temperature. The percent solubility is the percent by weight of the resin in the total solution.

| Resin | Percent solubility |
| --- | --- |
| Dammar gum | Greater than 64 |
| Cumar | Do. 63 |
| Bakelite XR254 | 23 |
| Abietic acid | 48 |
| Vinylite 80 | Greater than 9 |
| Vinyl acetate | Do. 10 |
| Rezyl 12 | Do. 16 |
| Resin A of petroleum origin | Do. 69 |
| Resin B of petroleum origin | Do. 54 |

Bakelite XR254 is described by Turkington et. al in J. I. E. C., Volume 23 (1931) page 791. Vinylite 80 is described in "Synthetic Organic Chemicals", third edition, page 32, published April 15, 1930, by Union Carbide and Chemical Corporation. Rezyl 12 is described by H. A. Gardner in "Physical and Chemical Examination of Paints, Varnishes, Lacquers and Colors", page 519, fifth edition, published 1930 by the Institute of Paint and Varnish Research, Washington, D. C.

The vinyl acetate, Vinylite 80, and Rezyl 12 swell very slowly and dissolve at a very slow rate, but will dissolve to a much greater extent than indicated above with prolonged agitation.

Among the organic sulfur compounds suitable as solvents for resins are the thio-ethers such as methyl, ethyl, propyl, phenyl and similar mixed thio-ethers; the corresponding disulfides, and similar tri-, tetra- and penta-sulfides. Not all of the organic sulfide solvents suitable for this invention are liquid but all may be used in conjunction with other liquid solvents customarily used for resins to form liquid solutions and the viscous or solid sulfur compounds may be used alone as plasticizers or for other purposes with the resins to form apparently homogeneous solid solutions which may be either true or colloidal solutions. These solutions may be used with suitable additions such as drying oils, pigments and the like in the production of paints or varnishes, with pyroxylin or other suitable cellulose plastics and solvents therefor in the production of lacquers, and as impregnation agents for rubber, cellulose plastics, asbestos, mica, silica, wood flour, and the like in the preparation of plastic materials suitable for preparing moulded articles.

These organic sulfur solvents may be readily derived from the sulfur compounds such as the mercaptans existing in petroleum oils. The mercaptans may be separated from petroleum oils such as cracked light naphthas by treatment with an aqueous solution of caustic soda in which they are preferentially dissolved as mercaptides. Free mercaptans may be readily obtained by distilling the spent soda solution with steam and may be converted into thio-ethers by passage over suitable catalysts such as cadmium sulfide. The disulfides may be obtained by subjecting the spent caustic solution to a limited oxidation, as with air at temperatures of about 100° C. Polysulfides may be prepared by reacting either the thio-ethers or disulfides with metallic polysulfides or by other suitable means. The organic sulfides derived from petroleum by the above methods are usually complex mixtures and may be used as such, or after separation into pure compounds, as resin solvents. In fact it is generally not necessary to prepare the pure organic sulfur compounds for these solvent purposes and the complex mixtures as obtained from the organic sulfur compounds derived from petroleum form desirable solvents which may be fractionated to any desired boiling range.

In the appended claims in the formula $RS_nR'$, R and R' may be any organic radical either aryl, alkyl, or mixed, and either the same or different, and "$n$" may be any integer, preferably 1 or 2 and not greater than 5.

My invention is not to be limited to any examples of the uses of the organic sulfides mentioned herein for purposes of illustration nor to any theory of the solvent action of the solvents but only by the following claims in which I wish to claim all novelty insofar as the prior art permits.

I claim:

1. Composition according to claim 7 in which said resin is derived from a cracked petroleum tar.

2. Composition according to claim 7 in which said resin is a hydrocarbon resin of petroleum origin.

3. Composition according to claim 7 in which said resin is a hydrocarbon resin.

4. Composition according to claim 7 in which said resin is a phenol resin.

5. Composition according to claim 7 in which said resin is a sulfur resin.

6. Composition according to claim 7 in which said compound is a viscous to solid compound and is used to plasticize said resin.

7. Composition of matter comprising a solution containing a resin and a compound of the formula $RS_nR'$, in which R and R' are hydrocarbon radicals and $n$ is any integer.

8. A composition of matter comprising a solution containing a resin and a thioether having the formula $RSR'$, in which R and R' are hydrocarbon radicals of not more than 6 carbon atoms each.

9. A composition according to claim 8 in which the thioether is a dialkyl thioether.

10. A composition of matter comprising a solution containing a resin and an organic disulfide having the formula $RS_2R'$, in which R and R' are hydrocarbon radicals of not more than 6 carbon atoms each.

11. A composition according to claim 10 in which the organic disulfide is a dialkyl disulfide.

12. A composition of matter comprising a solution containing a resin and a polysulfide having the formula $RS_nR'$, in which R and R' are hydrocarbon radicals of not more than 6 hydrocarbon atoms and $n$ is an integer from 3 to 5.

13. A composition of matter comprising a solution containing a resin and a mixture of compounds of the formula $RS_nR'$ in which R and R' are hydrocarbon radicals of not more than 6 carbon atoms and $n$ is an integer between 1 to 5 inclusive, corresponding to the mixture of mercaptans extracted from petroleum with aqueous caustic soda.

WILLIAM SEAMAN.